(12) United States Patent
Guest

(10) Patent No.: US 6,439,620 B1
(45) Date of Patent: Aug. 27, 2002

(54) TUBE SUPPORT

(76) Inventor: John Derek Guest, 'Iona', Cannon Hill Way, Bray, Maidenhead, SL6 2EX (GB)

(*) Notice: Subject to any disclaimer, the term of this patent is extended or adjusted under 35 U.S.C. 154(b) by 0 days.

(21) Appl. No.: 09/439,588

(22) Filed: Nov. 12, 1999

(30) Foreign Application Priority Data

Nov. 24, 1998 (GB) ............................................. 9825743
Jan. 14, 1999 (GB) ............................................. 9900815

(51) Int. Cl.$^7$ ............................................. F16L 17/00
(52) U.S. Cl. ..................................... 285/347; 285/239
(58) Field of Search ................................. 285/347, 239, 285/238, 242, 249, 256, 257, 259

(56) References Cited

U.S. PATENT DOCUMENTS

| | | | | |
|---|---|---|---|---|
| 651,134 A | * | 6/1900 | Dickens .................. | 285/239 X |
| 2,314,386 A | * | 3/1943 | Brend .................... | 285/347 X |
| 2,413,106 A | * | 12/1946 | Kelle ..................... | 285/347 X |
| 2,477,533 A | * | 7/1949 | Whiting .................. | 285/347 X |
| 2,485,976 A | * | 10/1949 | Main ..................... | 285/256 X |
| 2,932,531 A | * | 4/1960 | Briechle ................ | 285/110 |
| 3,317,214 A | * | 5/1967 | Durgom .................. | 277/626 |
| 3,973,791 A | * | 8/1976 | Porta et al. ............ | 285/305 |
| 4,564,222 A | * | 1/1986 | Loker et al. ............ | 285/255 |
| 4,593,942 A | * | 6/1986 | Loker .................... | 285/259 X |
| 4,906,030 A | * | 3/1990 | Yokomatsu et al. ..... | 285/256 X |
| 5,961,157 A | * | 10/1999 | Baron et al. ............ | 285/256 |

FOREIGN PATENT DOCUMENTS

| | | | | |
|---|---|---|---|---|
| CA | 685353 | * | 4/1964 | .................. 285/256 |
| DE | 295 06 835 | | 4/1995 | .......... F16L/33/207 |
| EP | 0 268 251 A1 | | 11/1987 | .......... F16L/39/00 |
| EP | 0 333 949 B1 | | 12/1991 | .......... F16L/37/08 |
| EP | 555650 A1 | * | 8/1993 | .................. 285/256 |
| EP | 0 351 466 B1 | | 9/1993 | .......... F16L/37/08 |
| EP | 0 540 364 B1 | | 7/1995 | .......... F16L/39/00 |
| EP | 0 756 126 A1 | | 1/1997 | .......... F16L/37/092 |
| FR | 1 496 737 | | 4/1966 | |
| GB | 2 178 810 B | | 10/1988 | .......... F16L/21/08 |

* cited by examiner

Primary Examiner—Lynne H. Browne
Assistant Examiner—David E. Bochna
(74) Attorney, Agent, or Firm—Baker & Daniels

(57) ABSTRACT

A tube end support (10) for locating a tube end coupling comprises a sleeve (11) to be received in a tube having an encircling head (12) adjacent one end of the sleeve to limit entry of the sleeve into the tube. A gripper device (16) is disposed on the sleeve grips on the internal diameter of a tube to hold the tube on the sleeve. An annular seal (19) is supported in a groove (18) in the head (12) to seal with the internal diameter of a tube coupling in which the assembly of the end support and tube are located.

2 Claims, 4 Drawing Sheets

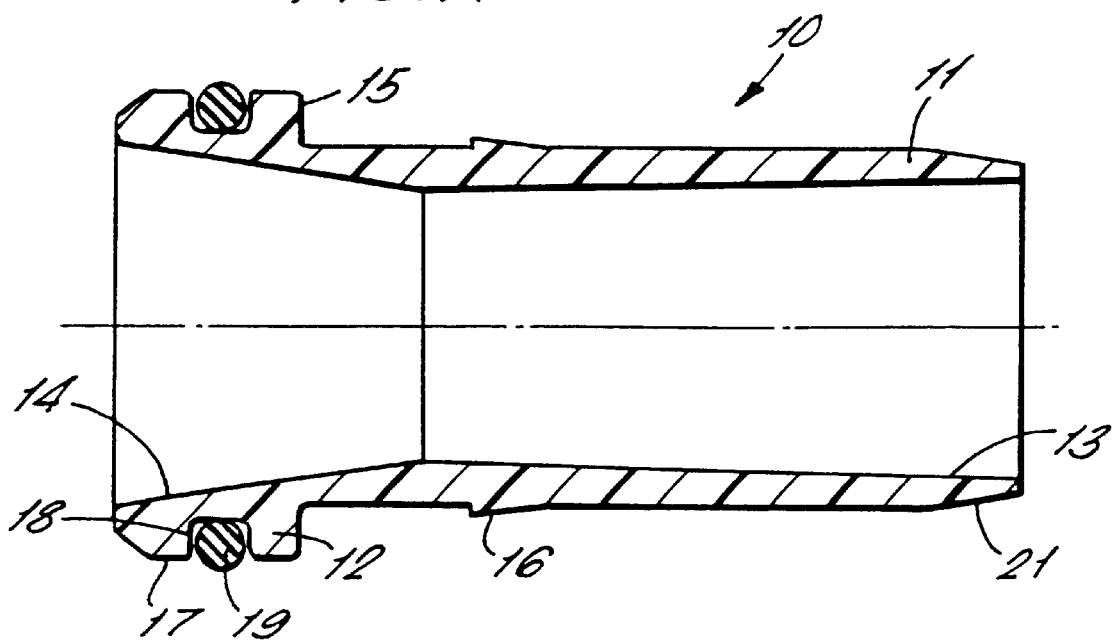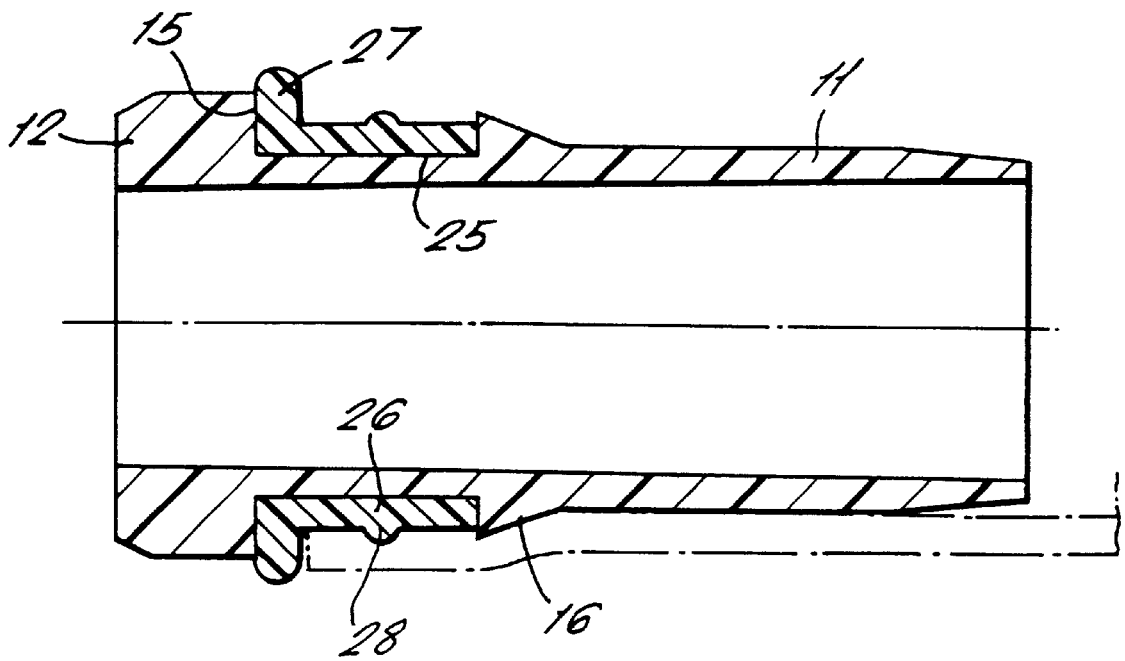

TUBE SUPPORT

DESCRIPTION OF THE INVENTION

1. Field of the Invention

This invention relates to a tube end support for locating a tube end in a tube coupling.

2. Background Prior Art

My European Patent Publication No. 0756126 discloses a tube coupling comprising a coupling body having a throughway open at one end to receive a tube, the diameter of the throughway increasing towards said open end at a first step to form a first enlarged diameter portion to receive a tube and a second step to form a second enlarged diameter portion to receive a tube locking device to hold a tube in the coupling body. A thin wall sleeve has one end engageable in the throughway and the other engageable in the tube to be located in the coupling body so that, in use, the sleeve extends from the tube past the first step into the throughway. The sleeve has a sealing engagement with the internal diameter of the tube to prevent leakage between the sleeve and tube and the end of the sleeve projecting from the tube has an annular seal with seals with the throughway in the coupling body to prevent leakage between the sleeve and coupling body.

SUMMARY OF THE INVENTION

The invention provides a tube end support for locating a tube end in a tube coupling, comprising a sleeve to be received in a tube, an encircling end stop adjacent one end of the sleeve to limit entry of the sleeve into the tube, encircling gripper means on the sleeve to grip on the internal diameter of a tube to hold the tube on the sleeve and a separate annular seal supported by the end and projecting radially outwardly thereof to seal with the internal diameter of a tube coupling in which the assembly of the end support and tube are located.

In one arrangement according to the invention the sleeve is formed with an encircling head at said one end thereof which provides the end stop for limiting insertion of the sleeve into the tube and supports the separate annular seal for sealing with the internal diameter of the tube.

More specifically the head may have an encircling annular groove around its periphery and an O-ring seal is mounted in the groove to connect radially therefrom for sealing with the internal diameter of the tube.

The aforesaid gripping means for gripping the internal diameter of the tube may comprise an integral annular barb formed on the outer diameter of the sleeve facing towards the head at the end of the sleeve, over which the tube must be forced when inserting the sleeve into the tube to grip and hold the sleeve in the tube.

In an alternative arrangement said one end of the sleeve may have an encircling head projecting outwardly of the sleeve, a gripping means comprising an annular barb formed integrally with the outer diameter of the sleeve at a spaced location from the head to grip the internal diameter of the tube inserted over the sleeve, and a collar of elastomeric material extends around the sleeve between the barb and head with an outwardly projecting annular flange adjacent the head extending beyond the outer periphery of the head to provide a seal with an inner diameter of a connector body in which the assembly is located.

In the latter arrangement the elastomeric collar has a raised annular ridge encircling the outer periphery of the collar to seal with the internal diameter of the tube.

BRIEF DESCRIPTION OF THE DRAWINGS

The following is a description of some specific embodiments of the invention, reference being made to the accompanying drawings in which:

FIG. 1 is a diagrammatic illustration of one form of tube end support for locating a tube end in a tube coupling body;

FIG. 2 is a similar view of an alternative form of tube end support;

DESCRIPTION OF THE PREFERRED EMBODIMENTS

Figure 3:
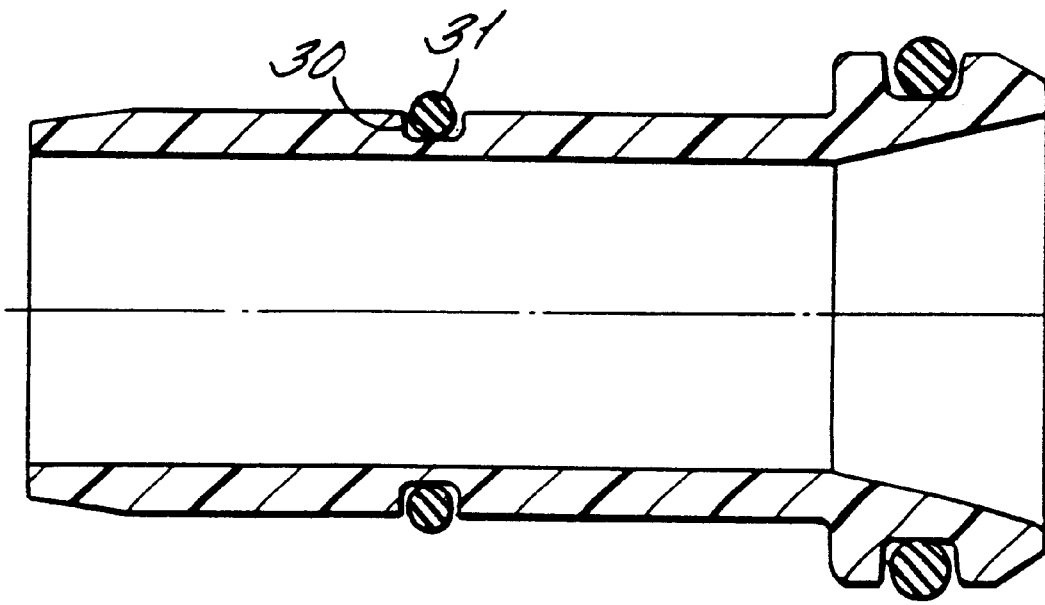
FIG. 3 shows a first modified form of the tube end support of FIG. 1 of my previous application.

Referring firstly to FIG. 1, of the drawings, there is shown a tube end support indicated generally at 10 for locating in an end part of a tube to be inserted in the throughway of a coupling body of a tube coupling having a locking device such as a collet to engage the tube end and seals to seal with the tube end.

The tube end support comprises a hard plastics sleeve 11 having an annular head 12 at one end thereof. The sleeve has an internal bore 13 having a flared end 14 at said head end of the sleeve.

The head 12 of the sleeve provides a radially annular face 15 directed along the sleeve which forms an end stop to limit insertion of the sleeve into a tube end by engagement with the end of the tube. Spaced along the sleeve from the face 15 is an annular barb 16 formed integrally with the outer diameter of the sleeve over which the tube is forced as the sleeve is pressed into the tube to grip and hold the sleeve in the tube.

The outer periphery 17 of the head is formed with an annular groove 18 in which an O-ring seal 19 is mounted to seal with the internal bore or throughway in the tube coupling body referred to above.

There is a significant length of sleeve 11 between the barb 16 and the end of the sleeve 20 remote from the head which is inserted into the tube. To facilitate entry of the sleeve end into the tube, the outer diameter of the sleeve is bevelled or chamfered, as indicated at 21. The significant length of sleeve between the end of the sleeve and barb, and the barb itself, provide an effective seal between the tube and the sleeve to prevent leakage of fluid between the tube and sleeve. The O-ring seal 19 provides an effective seal between the assembly and the internal bore or throughway in the coupling body to prevent leakage between the tube and coupling body.

FIG. 2 shows a further arrangement in which the O-ring 19 and groove 18 of the above embodiment are omitted. The annular barb 16 is formed somewhat larger than the barb shown in FIG. 1 and the outer diameter of the sleeve is formed with an encircling groove 25 between the barb 16 and head 12. An elastomeric collar 26 is located in the groove, the collar having a radially outwardly projecting annular flange 27 in engagement with the end face 15 of the head. The collar 27 projects outwardly beyond the head and the outer surface of the collar provides an annular seal with the internal diameter of the bore or throughway in the connector body.

The elastomeric collar 26 is further formed with an annular ridge 28 mid-way along the collar to engage the inside diameter of a tube in which the sleeve is inserted to seal with the internal diameter. The flange 27 at the end of the collar provides an end stop which the end of the tube engages.

The raised barb 16 grips the internal diameter of the tube as before but also lifts the tube over the seal when the sleeve is inserted into the tube. The arrangement is otherwise similar to that described with reference to FIG. 1 above.

Referring now to the embodiment of FIG. 3, the arrangement is generally similar to that of FIG. 1 and like parts have been allotted the same reference numerals. The arrangement of the head 15 and O-ring seal 19 at one end of the sleeve to seal in the tube coupling body is generally similar to that of FIG. 1 of the previous arrangement. The main difference is that the barb 16 of the previous arrangement is omitted and, in its place, the sleeve has an encircling groove 30 in which an O-ring seal 31 fits to seal in the tube engaged over the sleeve.

Figure 4:
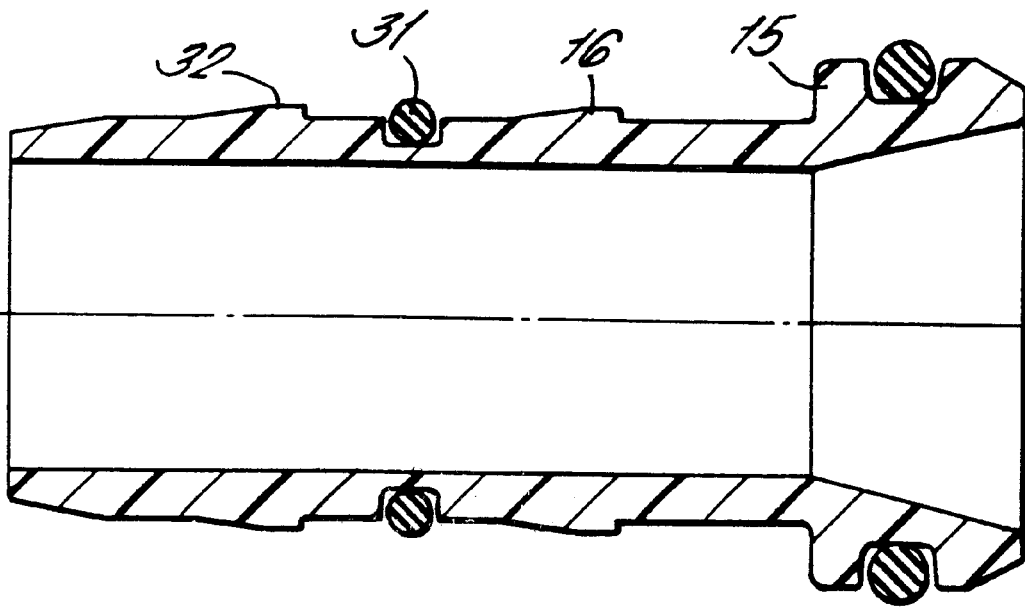
FIG. 4 shows a second modified form of the arrangement of FIG. 1.

FIG. 4 shows a modification to the arrangement of FIG. 3 in which the annular barbs 16 encircling the sleeve is retained disposed between the O-ring seal 31 and the head 15 of the sleeve and an additional similar annular barb 32 is formed on the sleeve on the other side of the O-ring seal to further enhance the grip of the sleeve in the tube end.

Figure 5:
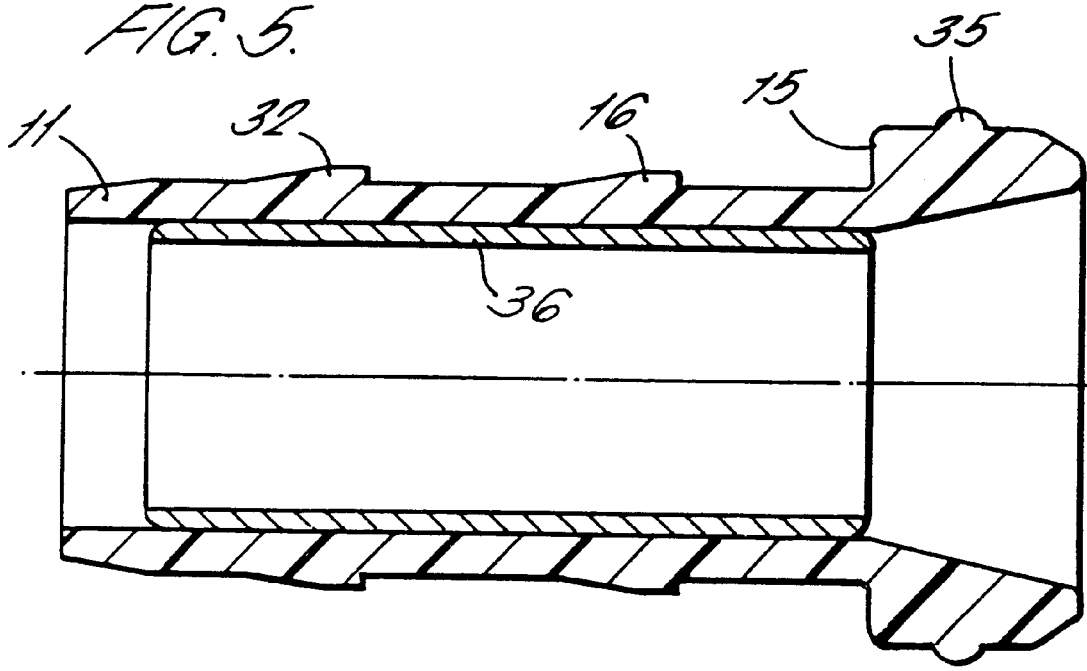
FIGS. 5 to 8 show still further arrangements.

In the arrangement of FIG. 5, the sleeve is formed in an elastomeric material such as "Hytrel" (trade name) which is sufficiently mechanically rigid but soft enough to provide a sealing function with a tube and coupling body. The O-ring seal 19 is omitted and in its place the head 15 is formed with an integral encircling raised seal 35. The O-ring seal 31 is omitted between the annular barbs 16 and 32 to stiffen the sleeve 11, a metal tube 36 is inserted in the sleeve, the tube could also be formed from a suitable plastics material of sufficient rigidity.

In the arrangement of FIG. 4, the sleeve 11 is formed from a plastics of sufficient rigidity to avoid the necessity of having a separate insert tube in the sleeve.

Figure 6:
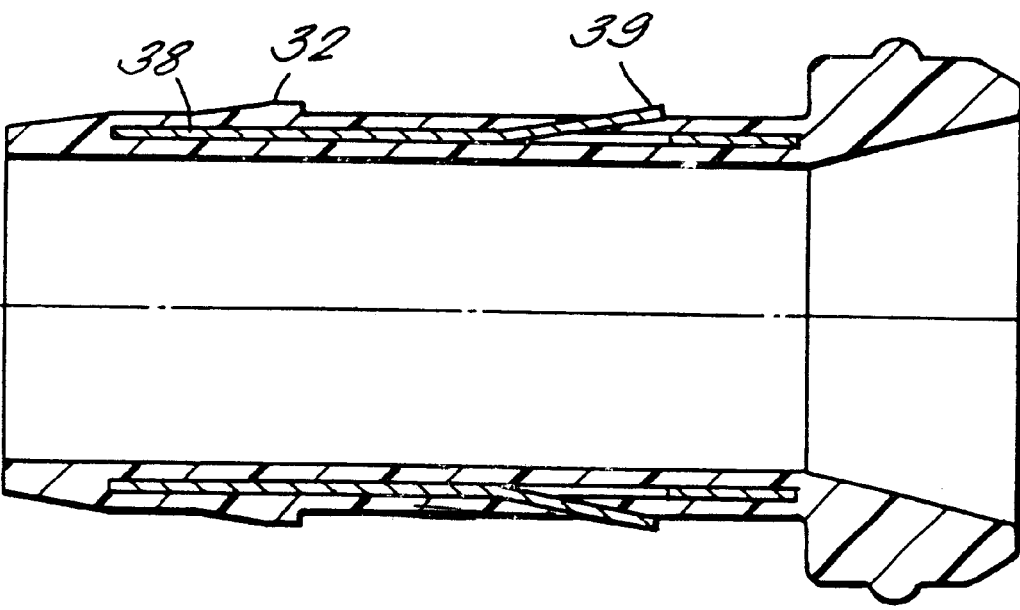

FIG. 6 shows a modified form of the coupling sleeve of FIG. 5 in which the barb 16 is omitted and the sleeve is again moulded in an elastomeric material with an additional metal tube 38 encapsulated within the sleeve and provided with preformed flexible teeth 39 which are angled to project through the outer surface of the sleeve to provide barbs for engaging the tube inserted over the sleeve. The teeth provide easy insertion of a tube over the sleeve but enhance the retention of the sleeve in the tube when under pressure or tensile load.

Figure 7:
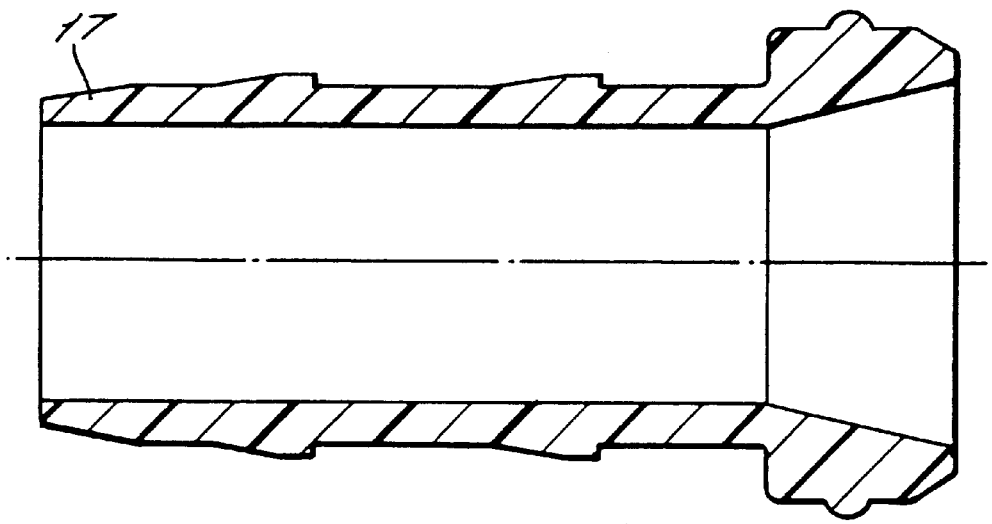

In the further development, the insert tube in the sleeve of FIG. 7 could be formed in plastics rather than metal and their teeth could be of rigid barb form. The external appearance of the component would then show "Hytrel" plastics at either end with a stiffer and harder plastic material projecting through the wall of the sleeve in the form of a barb part way along the sleeve adjacent the head.

Figure 8:
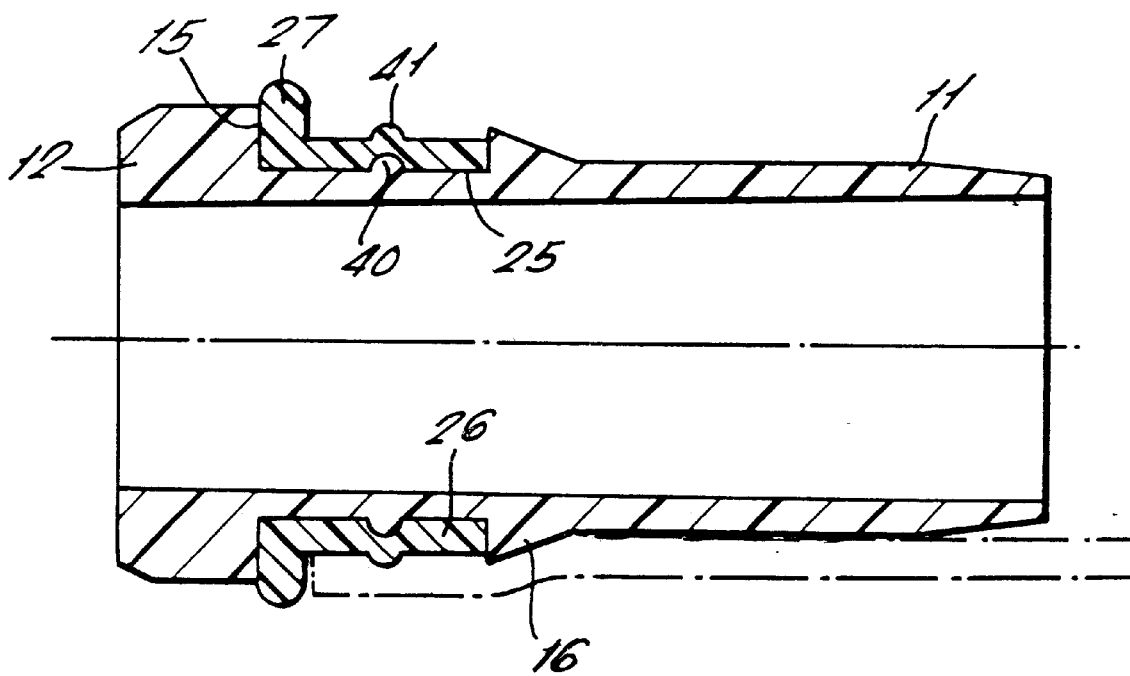

FIG. 8 shows a modification to the arrangement of FIG. 2 in which the moulded in annular ridge 28 on elastomeric collar is omitted. Instead, the base of groove 25 is formed with a moulded in annular ridge 40 and collar 26 takes up the shape of ridge 40 where it extends over the ridge to produce a corresponding annular ridge 41 encircling the outer periphery of the collar. It is easier to mould in ridge 40 in the groove 25 of sleeve 11 than preform the ridge in collar 25.

What is claimed is:

1. A tube end support for locating a tube end in a tube coupling, said tube end support comprising: a sleeve adapted to be received in a tube, an encircling end stop adjacent one end of the sleeve to limit entry of the sleeve into the tube, an encircling gripper located on the sleeve to grip the internal diameter of a tube to hold the tube on the sleeve, an annular seal supported by said one end and projecting radially outwardly of said encircling end stop to seal the tube end support with the internal diameter of a tube coupling in which the assembly of the tube end support and a tube are located, an encircling head disposed on said one end and projecting outwardly of the sleeve to define said encircling end stop, said encircling gripper comprising an integral annular barb disposed on an outer side of the sleeve at a spaced location from the encircling head, said annular seal comprising a collar of elastomeric material extending around the sleeve and located intermediate the barb and the encircling head.

2. A tube end support as claimed in claim 1, wherein the elastomeric collar includes a raised annular ridge encircling the outer periphery of the collar to seal with the internal diameter of the tube.

* * * * *